INVENTORS
FRANK HRIBAR, JR.
BY WAYLAND A. TENKKU
John D. Haney
ATTY.

United States Patent Office 3,394,723
Patented July 30, 1968

3,394,723
THREE-WAY PRESSURE ACTUATED VALVE
Wayland A. Tenkku, Mentor, and Frank Hribar, Jr., Kirtland, Ohio, assignors to Fluid Regulators Corporation, Painesville, Ohio, a corporation of Ohio
Filed May 27, 1964, Ser. No. 370,466
14 Claims. (Cl. 137—102)

This invention relates to directional control valves and more particularly to a special three-way pressure actuated directional control valve which is especially suitable for aircraft service in the operation of pneumatic ice-removal equipment.

The valve of this invention operates in a pneumatic ice-removal system to communicate, selectively, the inflatable ice-removal tubes or so-called "boots" on an airfoil with a pressurized fluid inflating medium. Normally the main directional control member of the valve is positioned to communicate the ice-removal tubes to a low pressure exhaust region. To inflate the tubes, the system inflating medium is communicated to the directional control member which shifts position in response to pressure of such medium to direct the inflating medium to the ice-removal tubes. To deflate the tubes, the system inflating medium is diverted from the directional control member, but this member is adapted to remain in its actuated position for a determinate period so that the major proportion of the inflating medium exhausts reversely through the pressure inlet port of the valve rather than through the normal low pressure exhaust regions of the valve. After the pressure of the inflating medium has decayed substantially, the control member is adapted to shift automatically to its deactuated position, so that the residual portion of the inflating medium in the ice-removal tubes is exhausted through the normal low pressure exhaust regions of the valve. The delay or "dwell" period of the control member, during which the inflating medium is reversely exhausted, is accomplished by a throttling mechanism associated with the main control member.

The valve also includes auxiliary poppet valves in the exhaust region and a special locking mechanism which positively engages one of these poppet valves to hold it open during the period in which the inflating medium is reversely exhausted. The poppet valves and locking mechanism cooperate to provide for "fail-safe" operation of the system in the event of a malfunction of the pressure or exhaust equipment embodied in the system as hereinafter explained in more detail.

The invention will be further described with reference to the accompanying drawings which show, by way of example, a valve made according to and embodying this invention. The valve is described with particular reference to its use in a pneumatic ice-removal system for aircraft.

Figure 1:
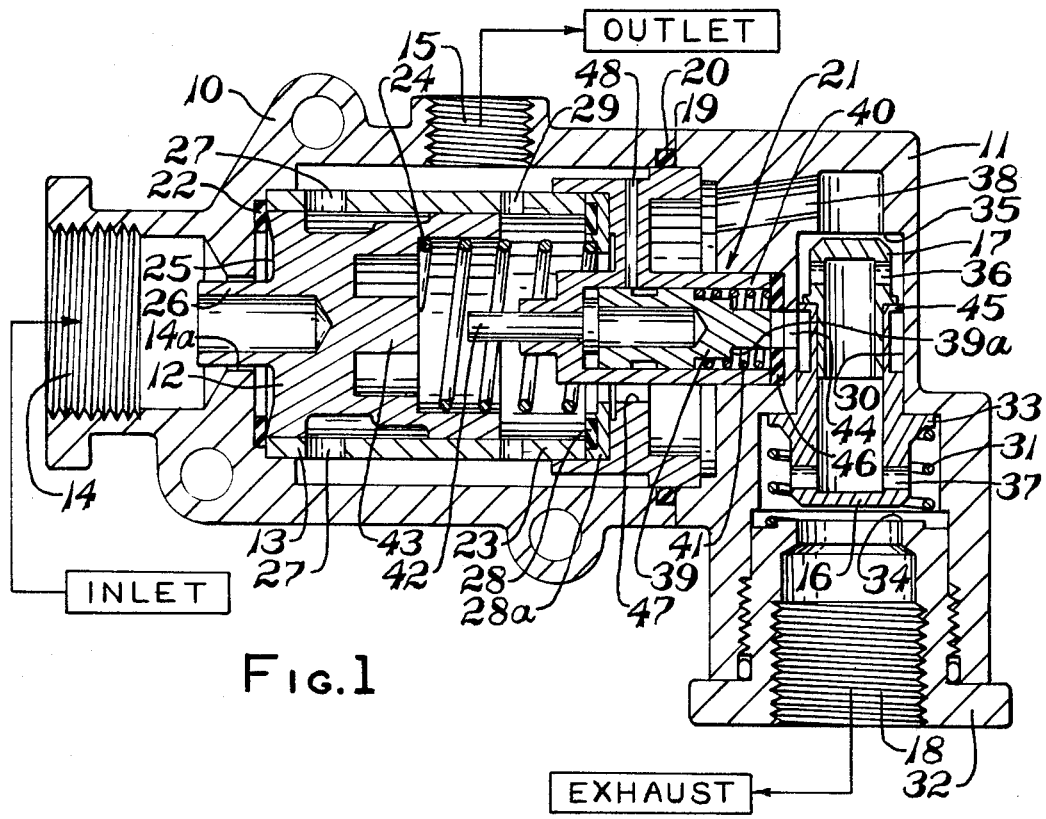
FIG. 1 is an axial cross section of the valve in its normal or de-actuated condition.

The valve shown in FIG. 1 includes two casings 10 and 11. Casing 10 houses a main directional control piston 12 that reciprocates in a sleeve 13, also located in casing 10, to control the communication of the system pressure medium between an inlet port 14 and an outlet port 15 to which the equipment operated by the valve is connected. Casing 11 houses two poppet type check valves 16 and 17, which are normally open, and which automatically control the communication of the system pressure medium between the outlet port 15 and an exhaust or low pressure port 18. The casings 10 and 11 fit together integrally at numeral 19 and this junction is sealed by gasket 20. Inside the casings 10 and 11, at this junction, there is a locking mechanism 21 which operates in cooperation with the piston 12 and the poppet valve 16 in a manner hereinafter described.

The sleeve 13 is firmly fixed in casing 10. The left end of this sleeve in FIG. 1 engages a seat 22 inside the casing and the right end of sleeve 13 fits snugly into a fitting 23, which forms a part of the locking mechanism 21. Both the sleeve 13 and the fitting 23 are fastened rigidly inside casing 10 by the engagement of casing 11 with casing 10 by means of bolts or screws (not shown).

Figure 2:
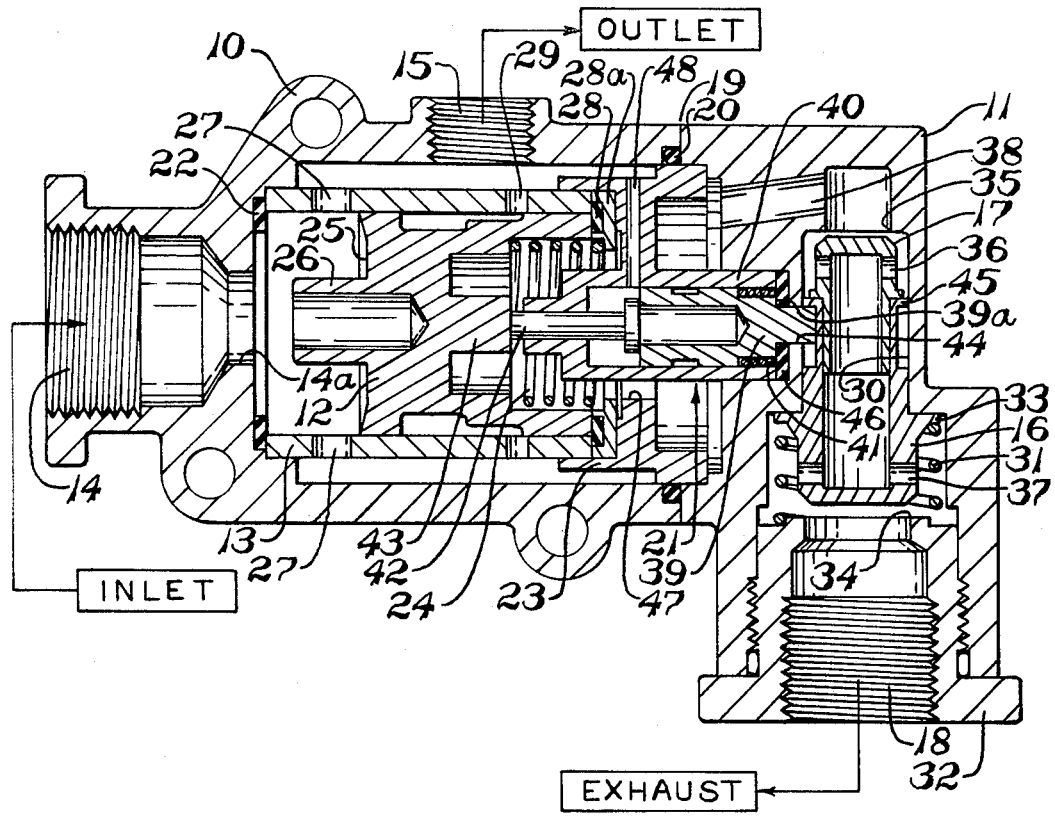
FIG. 2 is a view like FIG. 1 but showing the valve with its parts in its actuated position in which pressure is communicated to the inlet port of the valve.

The main directional control piston 12 slides reciprocatively inside sleeve 13 and is normally biased toward the position shown in FIG. 1 by a main spring 24, the piston 12 and spring 24 being sometimes collectively called herein the "main directional control member" of the valve. On the forward or left face 24 of piston 12 there is an exhaust throttle in the form of a shank 26 which projects through an inlet orifice 14a near inlet port 14 in the normal or de-actuated position of the valve. Face 25 of this piston, including exhaust throttle 26, is responsive to pressure of the fluid medium introduced to the valve at port 14 to displace the piston 12 rightward to its actuated position (as shown in FIG. 2) against the opposition of spring 24. In its forward or FIG. 1 position, piston 12 blocks communication between inlet port 14 and the outlet port 15 because in this position the piston is closed over a series of radial ports 27 near the left end of sleeve 13 and seals against annular rubber seat 22. In the actuated position of piston 12 (see FIG. 2), the right end of the piston 12 engages an annular rubber seat 28 on spring retainer ring 28a fitting between the end of sleeve 13 and fitting 23 of the locking mechanism. In the latter position ports 27 are open permitting communication between inlet port 14 and outlet port 15. Also, radial ports 29 in the right end of the sleeve 13, are closed by the piston, thereby blocking communication between the outlet port 15 and exhaust port 18.

The aft casing 11 houses poppet 16 which slides in a bore 30 located inside casing 11. The main poppet 16 is normally biased to an open position by a spring 31, which is caged under compression between a threaded adapter 32 and a flange 33 on poppet 16. Under certain operating circumstances later described, this poppet 16 is adapted for displacement against the opposition of spring 31 to close against an annular seat 34 on adapter 32 in the exhaust port 18.

The poppet 16 is tubular. At its upper end there is another smaller tubular poppet 17 telescopically engaged therewith. The latter poppet 17 is normally biased away from its seat 35 by airflow from outlet port 15 via port 38 to exhaust port 18 and is normally open relative to its seat 35 in casing 11 and is adapted to slide relative to the main poppet 16 to close this seat under certain special operating conditions subsequently described. The interior of the small poppet 17 is communicated to the inside of casing 11 through ports 36, and similarly the main poppet 16 has ports 37 communicating its interior to the external surrounding space in casing 11 containing the spring 31. These interior regions of casing 11 are in turn communicated to the inside of casing 10 by an internal port 38 in casing 11.

The fitting 23 of the locking mechanism 21 is held firmly inside casing 11 and against the right end of sleeve 13 by the engagement of casing 11 with casing 10. The fitting 23 forms a part of the locking mechanism 21 which otherwise includes a locking pin 39 slidable lengthwise inside a central tubular portion 40 of fitting 23. In this central tubular portion 40, the locking pin 39 is normally biased leftward by spring 41 to maintain a push rod 42 in a position where it is projected through the end wall of the tubular portion 40 for engagement with the main piston 12. The latter piston 12 includes a central boss 43 which is adapted to engage the front of the push rod 42 when piston 12 is displaced rightward by the fluid pressure to its actuated position. Displacement of the push rod 42 in turn displaces the locking pin 39 rightward against the resistance of spring 41.

The locking pin 39 is in register with a hole 44 in an internal wall of casing 11 through which the locking pin can be projected so that when displaced, the locking pin 39 is pushed against the side of the main poppet 16 under a flange 45 on the main poppet. In the latter position, the locking pin 39 positively locks the main poppet 16 against displacement in casing 11 thereby preventing closure of the poppet 16.

The right end of the central tubular portion 40 of fitting 23 projects into a corresponding hole in casing 11. Between the end of this tubular portion 40 and the casing wall there is an annular sealing gasket 46 through the center hole of which the locking pin projects in the actuated position of these parts as shown in FIG. 2. In the latter position, an annular shoulder 39a seals against this gasket.

Other features of the fitting 23 include a port 47 for communicating fluid pressure from the region of casing 10 in which the main spring 24 is housed to the opposite side of fitting 23 in the mouth of port 38.

The fitting 23 also has a radial port 48 leading from the region inside casing 10 near the outlet port 15 into the bore of the center tubular portion 40 in which the locking pin 39 reciprocates. This port 48 is adapted to communicate system pressure to the left end face of the locking pin 39 to hold the pin 39 in its locked position against the flange 45 of poppet 16 after the locking pin has been displaced to this position by the piston boss 43. Accordingly, the locking pin can remain in engagement with the poppet 16 as a function of system pressure, even though piston 12 has been displaced leftward to where it is disengaged from push rod 42.

In the normal or de-actuated condition of the valve as shown in FIG. 1, the outlet port 15 is in direct communication with the exhaust or low pressure port 18 via: ports 29 in sleeve 13; the interior of sleeve 13; port 47 in fitting 23; port 38 in aft casing 11; ports 36 in the auxiliary poppet 17 and ports 37 in the main poppet 16. The main piston 12 is biased leftward to close ports 27 in the sleeve 13.

When using this valve in an aircraft ice-removal system, inlet port 14 will be connected to a pressurized fluid inflating medium such as compressed air from an engine driven compressor or the like (not shown). The exhaust port 18 is connected to a suitable source of low pressure, preferably the sub-ambient low pressure side of the same compressor (not shown). Inflatable ice-removal tubes (not shown) or the like are connected to the valve through outlet port 15. The system operates so that a vacuum or very low pressure is continuously maintained inside casing 11 through the exhaust port 18 assuring that any fluid in the ice-removal tubes is evacuated thereby giving the tubes a smooth airfoil contour.

To inflate the ice-removal tubes, high pressure air or other system fluid medium is communicated to port 14 where it acts against the pressure face 25 of main piston 12. Piston 12 is displaced rightward in response to this pressure until its right end comes to rest against the sealing gasket 28. In this position, sleeve ports 27 are uncovered permitting direct communication of pressure from port 14 to sleeve ports 27 and through outlet port 15 to inflate the ice-removal tubes. Also, in this actuated position, the piston 12 closes sleeve port 29 thereby blocking communication of system fluid pressure to the low pressure inside aft casing 11, the latter pressure being maintained at all times, even during the inflation operation of the ice-removal boots.

The displacement of piston 12 also brings the boss 43 of the piston into engagement with push rod 42 so that the locking pin 39 is displaced rightward and projected through hole 44 and under flange 45 on poppet 16 thereby locking the poppet 16 to prevent it from closing against its seat 34. The purpose of this locking is to prevent the poppet 16 from closing during the period in which the ice-removal tubes are deflated by reversely exhausting the inflating medium through the inlet port 14. Although the locking pin 39 is locked against poppet 16 by the engagement with piston boss 43, the pin 39 is thereafter held in its locked position by the system pressure acting through port 48 on the left face of pin 39.

When it is desired to deflate the ice-removal tubes, the high pressure air supply is diverted (by means not shown) from inlet port 14 so that the high pressure in the fully inflated ice-removal tubes immediately begins to decay by reversely exhausting to ambient pressure through outlet port 15 of the valve and through sleeve port 27 and through the inlet port 14. Exhaust throttle 26 assures that the major portion of the pressure is exhausted reversely through the inlet port 14.

Exhaust throttle 26 is completely withdrawn from orifice 14a when the valve is in its actuated position as shown in FIG. 2. Therefore, at the start of the deflation phase, the pressurized inflating medium in the tubes can flow through orifice 14a without substantial impedance. As soon as there is some reduction in the pressure of the medium in the tubes, piston 12 begins to move leftward (by spring 24) to a position in which exhaust throttle 26 has re-entered orifice 14a, thereby greatly reducing the cross-sectional area of orifice 14a through which the inflating fluid can pass to inlet port 14. Consequently, orifice 14a functions as a restrictor orifice, and the resulting back-pressure on the pressure face 25 of piston 12 acts to retard further movement of the piston 12 toward its de-actuated or FIG. 1 position.

The inlet port 14 accordingly remains open to the outlet port 15 during the period in which adequate back-pressure exists to hold piston 12 away from sleeve port 27 so that most of the inflating medium can exhaust through the outlet port to the inlet port 14. Eventually the back-pressure acting on face 25 of piston 12 will be reduced to a level such that spring 24 will force the piston 12 to its fully de-actuated position, closing inlet port 14 entirely. The residual quantity of the inflation medium remaining in the ice-removal tubes is then exhausted through the exhaust port 18 via sleeve port 29, fitting port 47 and then through ports 36 and 37 of the open poppets 17 and 16, respectively.

Even though the piston 12 moves leftward during the foregoing deflation period, the locking pin 39 remains in engagement with poppet 16 because the pressure of the inflating medium acts through port 48 on the left side of the locking pin. By the time the pressure of the inflation medium has decayed to a value low enough to allow piston 12 to return to its deactuated position, the spring 41 of the locking pin can expand to re-set the locking pin. The pressure at which the locking pin is re-set is lower than the pressure necessary to close poppet 16. Through the action of the locking mechanism and poppets 16 and 17, the valve of this invention provides for fail-safe operation in the event there are certain malfunctions of the equipment. Ordinarily, the inflatable ice-removal tubes on each wing of the aircraft are individually provided with a source of high pressure (such as a pump, pressure bottle, etc.) and are separately controlled by a valve of the type described. Additionally, the pressure supply and the valve for each tube set is interconnected with the corresponding parts of the other tube set so that both tube sets may be operated, if necessary, through a single pressure source and direction control valve.

One type of malfunction which can occur in a tandem system of this type is that the supply of pressurized inflating medium to one of the ice-removal tubes may fail for some reason. If this condition occurs, there will be no pressure available at the inlet port 14 of the valve associated with the deficient pressure source and consequently no pressure available to displace piston 12. However, because of the interconnection with the companion system, high pressure from the companion system will be communicated to the outlet port 15 of the inoperative supply system. Should that condition prevail, this high pressure air will enter the valve at the outlet port 15 to be communicated via sleeve port 29 and aft casing port 38 to the main poppet 16. This poppet 16 will immediately respond to the force applied to it by such pressure by overcoming spring 31 and closing on its seat 34, thereby preventing the leakage of the high pressure air from the entire system. Accordingly, it is evident that in a system equipped with these valves in tandem, either pressure source can be used to inflate the ice-removal equipment.

Another possible malfunction in a tandem system would be that the equipment for maintaining a low pressure (which is preferably sub-ambient pressure) at the exhaust port 18 of one of the valves would fail. If this happens, the pressure at the exhaust port 18 will sharply increase; therefore the exhaust poppet 17 is caused to slide upwardly relative to poppet 16 to engage its seat 35. Accordingly, the evacuating equipment associated with the companion portions of such tandem system will continue to remove the pressure medium from 11 the ice-removal equipment of the tandem system. Except for this action, ambient pressure would flood the system and the inflatable ice-removal equipment through the exhaust port 15 of the valve associated with the defective evacuating equipment.

Figure 3:
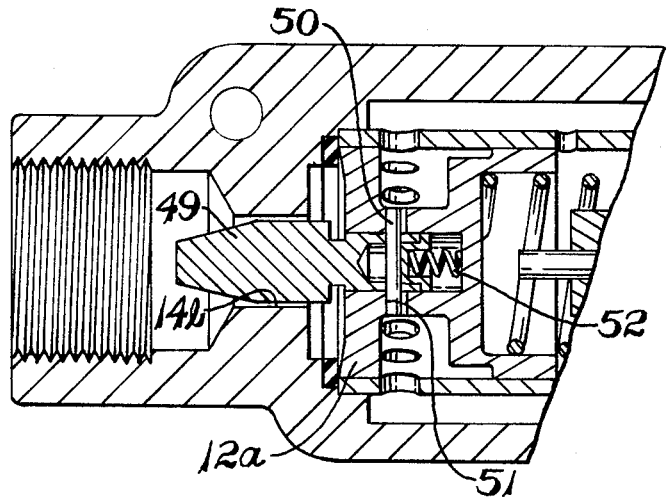
FIG. 3 is a partial axial cross section of a modified form of the valve.

FIG. 3 illustrates a form of valve which is the same as FIG. 1 except that it has a different form of exhaust throttle 49 attached to the main flow regulator piston 12a. In the FIG. 3 valve, the exhaust throttle 49 tapers to a smaller diameter in the direction toward the high pressure source and is loosely connected to piston 12a by a pin 50 extending through slots 51 and a part of the shank 49 which projects inside piston 12a. Exhaust throttle 49 is biased away from the piston 12a by a spring 52. By virtue of its taper and the loose displaceable connection it has with piston 12a, the exhaust throttle 49 operates to throttle the flow of pressure fluid through the restrictor orifice 14b in FIG. 2 at a different rate than the corresponding parts in the FIG. 1 valve. That is to say, in view of the shape of the exhaust throttle and its spring biased sliding connection 50, 51 with piston 12a, the back pressure to retard the return movement of piston 12a may be maintained for a period which differs from that with the FIG. 1 valve. The taper and the sliding connection of the exhaust throttle also operate to vary the area of the orifice 14b as the shank is withdrawn from orifice 14b during the inflating phase of the ice-removal tubes so that the inflating medium is not throttled into the valve during the inflating phase, because inflation pressure acts against exhaust throttle 49 compressing spring 52, thereby, removing exhaust throttle 49 from the inflation flow path.

Variations of the construction discussed may be made within the scope of the appended claims.

We claim:

1. A valve comprising a casing with inlet, outlet, and exhaust ports; a directional control member in the casing to provide for three-way flow of a fluid medium between said ports; means for displacing said control member to direct flow between said inlet and outlet ports and to close said exhaust port; valve means in said exhaust port normally maintaining said exhaust port open and adapted to close said exhaust port from said outlet port in response to a preselected pressure difference between said exhaust port and said outlet port; and locking means engageable with the latter said valve means to positively prevent the latter asid valve means from closing said exhaust port when the flow control member is in a position permitting flow between said inlet port and said outlet port.

2. A valve according to claim 1 wherein said locking means is engaged by said control member to bring said locking means into engagement with said valve means.

3. A valve comprising a casing with inlet, outlet, and exhaust ports; a directional control member reciprocative in the casing to provide for three-way direction control of a fluid medium between said ports; a sleeve in the casing in which said control member reciprocates, a port in said sleeve normally closed by said control member but open to communicate pressure between said inlet and said outlet port when the control member is displaced to a position in said said sleeve to close said exhaust port, said sleeve port providing for reverse flow of fluid from said outlet to said inlet port when pressure is removed from said inlet port, throttling means on said control member; a restrictor orifice at said inlet port; means for continuously biasing said control member toward a position in which said throttling means is urged axially into said orifice, said control member being responsive to pressure of a fluid medium at said inlet port for reciprocation to a position to communicate said pressure to said outlet port, and said throttle means functioning to retard the opposite reciprocative movement of said control member affected by said biasing means when said pressure medium is diverted from said inlet port to allow reverse flow of said medium from said outlet port through said sleeve port to said inlet port.

4. A valve comprising a casing with inlet, outlet, and exhaust ports; a directional control member reciprocative in the casing to provide for three-way direction control of a fluid medium between said ports; means for biasing said control member to a position in which said inlet ports are normally closed and said outlet port is communicated to said exhaust port, and said control member being responsive to a fluid pressure medium communicated to said inlet port for displacement to a position in which said inlet port and said medium is communicated to said outlet port; valve means in said exhaust port normally maintained said exhaust port open and adapted to close said exhaust port from communication with said outlet port in response to a preselected pressure difference of said medium between said exhaust port and said outlet port; and locking means engageable with the latter said valve means to positively prevent the latter said valve means from closing said exhaust port when said flow control member is in a position in which pressure is communicated between said inlet port and said outlet port.

5. A valve according to claim 4 and further comprising means on the control member for throttling the flow of fluid pressure medium reversely through the inlet port when said pressure medium is diverted from said inlet port, whereby said control member is retarded by said pressure medium in its movement toward its position in which said control member closes said inlet port.

6. A valve according to claim 5 wherein said throttling means is a shank carried on said control member and which projects into an inlet restrictor orifice at said inlet port to an extent dependent upon the axial position of said conrol member relative to said orifice.

7. A valve according to claim 6 wherein said shank is tapered to vary the area of the said restrictor orifice.

8. A valve according to claim 6 and which further includes means for connecting said shank to said control member so that said shank is movable axially relative to said control member as well as movable therewith.

9. A valve according to claim 4 wherein said valve means for said exhaust port includes a poppet responsive tc a predetermined higher pressure at said outlet port to close said exhaust port to prevent the passage of the fluid medium to the latter from said outlet port.

10. A valve according to claim 4 wherein said valve means at said exhaust port includes a poppet responsive to a predetermined lower pressure at said outlet port than at said exhaust port to close said exhaust port.

11. A valve according to claim 4 wherein said valve means at said exhaust port comprises a pair of tubular telescopically engaged poppet members, and means biasing each of said members to a normally open position relative to said exhaust port, one of said poppet members being responsive to a predetermined higher pressure at the outlet port than at the exhaust port to close said exhaust port, and the other of said poppet members being responsive to a predetermined higher pressure at said exhaust port than at said outlet port to close said exhaust port.

12. A valve according to claim 4 wherein said locking mechanism comprises a locking member normally disengaged from said exhaust valve means and which member is movable in response to the displacement of said control member to bring said locking member into engagement with said exhaust valve means.

13. A valve according to claim 12 wherein said locking means includes means responsive to the fluid pressure medium at said outlet port to maintain said locking means in engagement with said exhaust valve means independent of the position of said control member after said control member actuates said locking means.

14. A valve according to claim 4 wherein said casing includes a sleeve therein in which said control member reciprocates, said sleeve having ports providing for communication between said inlet, outlet and exhaust ports depending on the position of asid control member in said sleeve.

References Cited

UNITED STATES PATENTS 2,979,069  4/1961  Valentine _____ 137—102

FOREIGN PATENTS 1,320,554  1/1963  France.
707,165  4/1954  Great Britain.

WILLIAM F. O'DEA, *Primary Examiner.*

H. W. WEAKLEY, *Assistant Examiner.*